(12) United States Patent
Kapasi et al.

(10) Patent No.: US 8,930,641 B1
(45) Date of Patent: Jan. 6, 2015

(54) SYSTEMS AND METHODS FOR PROVIDING MEMORY CONTROLLERS WITH SCHEDULER BYPASSING CAPABILITIES

(75) Inventors: Ravish Kapasi, Fremont, CA (US);
Jeffrey Schulz, Milpitas, CA (US);
Ching-Chi Chang, San Jose, CA (US);
Caroline Ssu-Min Chen, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 868 days.

(21) Appl. No.: 13/160,384

(22) Filed: Jun. 14, 2011

(51) Int. Cl.
*G06F 12/00* (2006.01)
*G06F 13/00* (2006.01)
*G06F 13/28* (2006.01)

(52) U.S. Cl.
USPC .......................................................... 711/149

(58) Field of Classification Search
CPC ..................... G06F 2207/3868; G06F 13/1626; G06F 13/1689; G06F 13/18; G06F 13/1663; G06F 13/161; G06F 13/1605
USPC .......................................................... 711/149
See application file for complete search history.

(56) References Cited

U.S. PATENT DOCUMENTS

| | | | | |
|---|---|---|---|---|
| 4,449,183 | A * | 5/1984 | Flahive et al. | 711/151 |
| 5,222,223 | A * | 6/1993 | Webb et al. | 711/140 |
| 6,457,095 | B1 | 9/2002 | Volk | |
| 6,745,308 | B2 * | 6/2004 | Frank et al. | 711/169 |
| 6,799,257 | B2 | 9/2004 | Sprangle | |
| 6,898,678 | B1 * | 5/2005 | Six et al. | 711/151 |
| 6,912,612 | B2 | 6/2005 | Kapur | |
| 7,366,854 | B2 | 4/2008 | Wastlick | |
| 2007/0156946 | A1 | 7/2007 | Lakshmanamurthy | |
| 2009/0313441 | A1 * | 12/2009 | Mochida et al. | 711/150 |
| 2011/0208926 | A1 * | 8/2011 | Chen et al. | 711/158 |
| 2012/0162237 | A1 * | 6/2012 | Chung | 345/532 |
| 2013/0046938 | A1 * | 2/2013 | Biswas et al. | 711/147 |

OTHER PUBLICATIONS

Designware Universal DDR Memory and Protocol Controllers. Website [online]. Synopsis Inc. [retrieved on Jun. 14, 2011]. Retrieved from the Internet: <URL: http://www.synopsys.com/dw/ipdir.php?ds=dwc_ddr_universal_ctls>.

* cited by examiner

*Primary Examiner* — Sheng-Jen Tsai
(74) *Attorney, Agent, or Firm* — Treyz Law Group; Jason Tsai

(57) ABSTRACT

An integrated circuit may have a memory controller that interfaces between master processing modules and system memory. A scheduling module may be used to handle memory access requests received from multiple master modules. The scheduling module may arrange the received memory access requests in an order for fulfillment with system memory. A bypass module may be used to provide a low latency bypass path that allows memory access requests to bypass the scheduling module. The bypass module may include an eligibility detection module that identifies memory access requests eligible for scheduler bypassing, a port selection module that provides a low latency bypass path for the eligible memory access requests, multiplexing circuitry that selects between memory access requests provided from the low latency bypass path and from the output of the scheduling module, and a masking module that prevents redundant fulfillment of memory access requests.

18 Claims, 10 Drawing Sheets

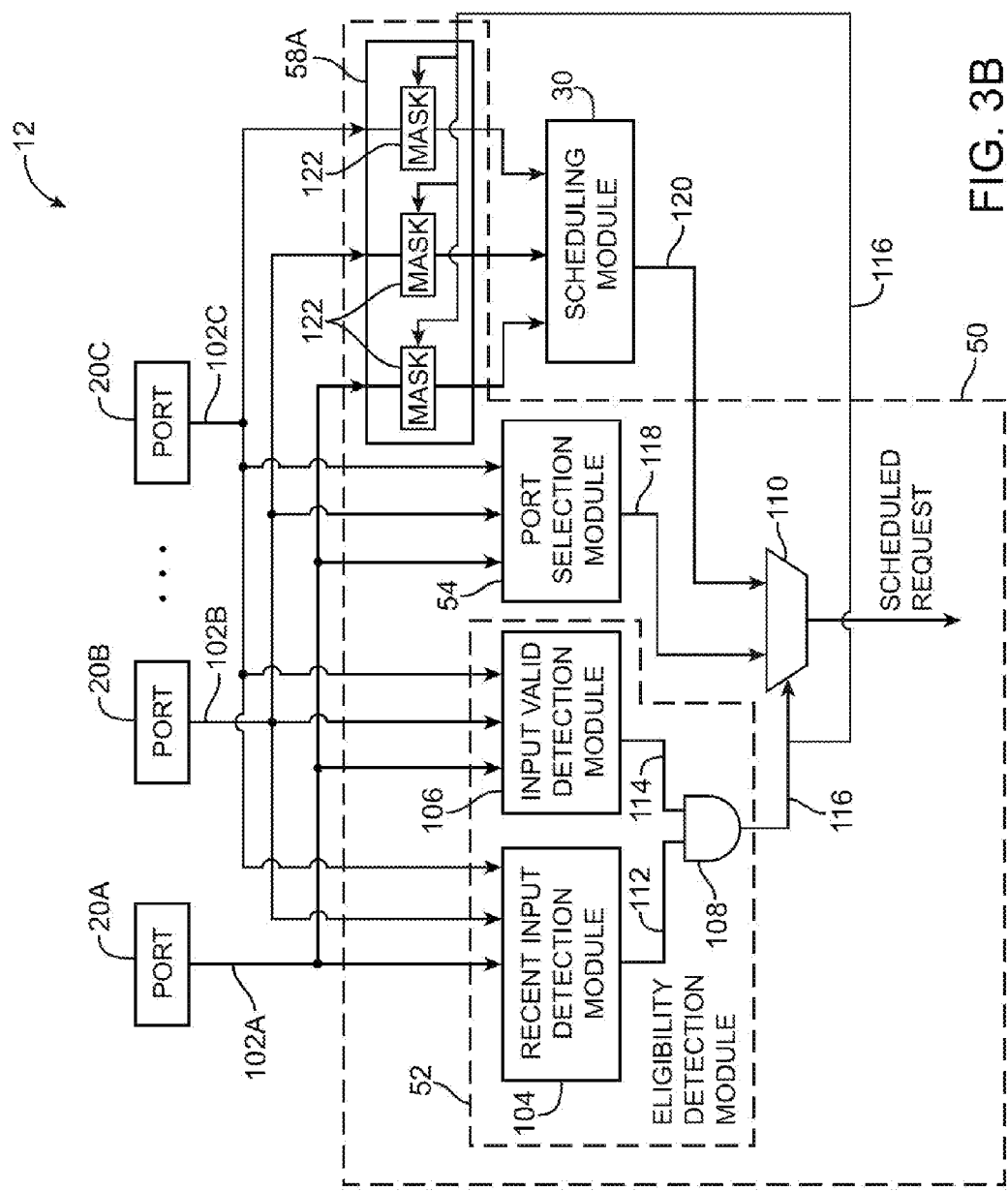

SYSTEMS AND METHODS FOR PROVIDING MEMORY CONTROLLERS WITH SCHEDULER BYPASSING CAPABILITIES

BACKGROUND

Integrated circuits often contain memory controllers for interfacing with memory. In a typical system, an integrated circuit can be used to communicate with system memory. In particular, the integrated circuit includes a memory controller that serves as an interface between the integrated circuit and system memory. The integrated circuit also includes processing modules configured to access system memory by sending memory access requests to the memory controller (i.e., the memory controller includes multiple ports each of which receives memory access requests from a respective processing module within the integrated circuit).

Conventional system memory can only be configured to fulfill a limited number of memory access requests within a given time. For example, consider a scenario in which the memory controller receives 12 memory access requests but system memory can only fulfill eight memory access requests within a given number of clock cycles. The memory controller includes a scheduler that receives the 12 memory access requests and that is used to rearrange the order of the memory access requests so that more urgent memory access requests are forwarded to system memory before less urgent memory access requests.

SUMMARY

An integrated circuit may be used to communicate with system memory. The integrated circuit may include multiple processing modules that are operable to perform tasks that require access to system memory. The integrated circuit may also include a memory controller that serves as an interface between the different modules and system memory. The various modules may be coupled to the memory controller and may sometimes be referred to herein as "master" processing modules.

A scheduling module (sometimes referred to as a scheduler or a scheduling circuit) may be used to accommodate memory access requests received concurrently from multiple master processing modules. The scheduling module may arrange the received memory access requests in a desired order for fulfillment with system memory.

A scheduler bypass module may be used to provide a low latency bypass path that allows memory access requests to bypass the scheduling module. The bypass module may include an eligibility detection module configured to identify memory access requests that are eligible for scheduler bypassing, a port selection module that provides a low latency bypass path for the bypass eligible memory access requests, multiplexing circuitry that selects between the low latency bypass path and the output of the scheduling module, and a masking module that prevents redundant fulfillment of memory access requests.

Further features of the present invention, its nature and various advantages will be more apparent from the accompanying drawings and the following detailed description.

BRIEF DESCRIPTION OF THE DRAWINGS

FIG. 3B is a diagram of an illustrative memory controller with a bypass module that masks memory access requests using masking circuitry at the input of a scheduling module in accordance with an embodiment of the present invention.

DETAILED DESCRIPTION

Figure 1:
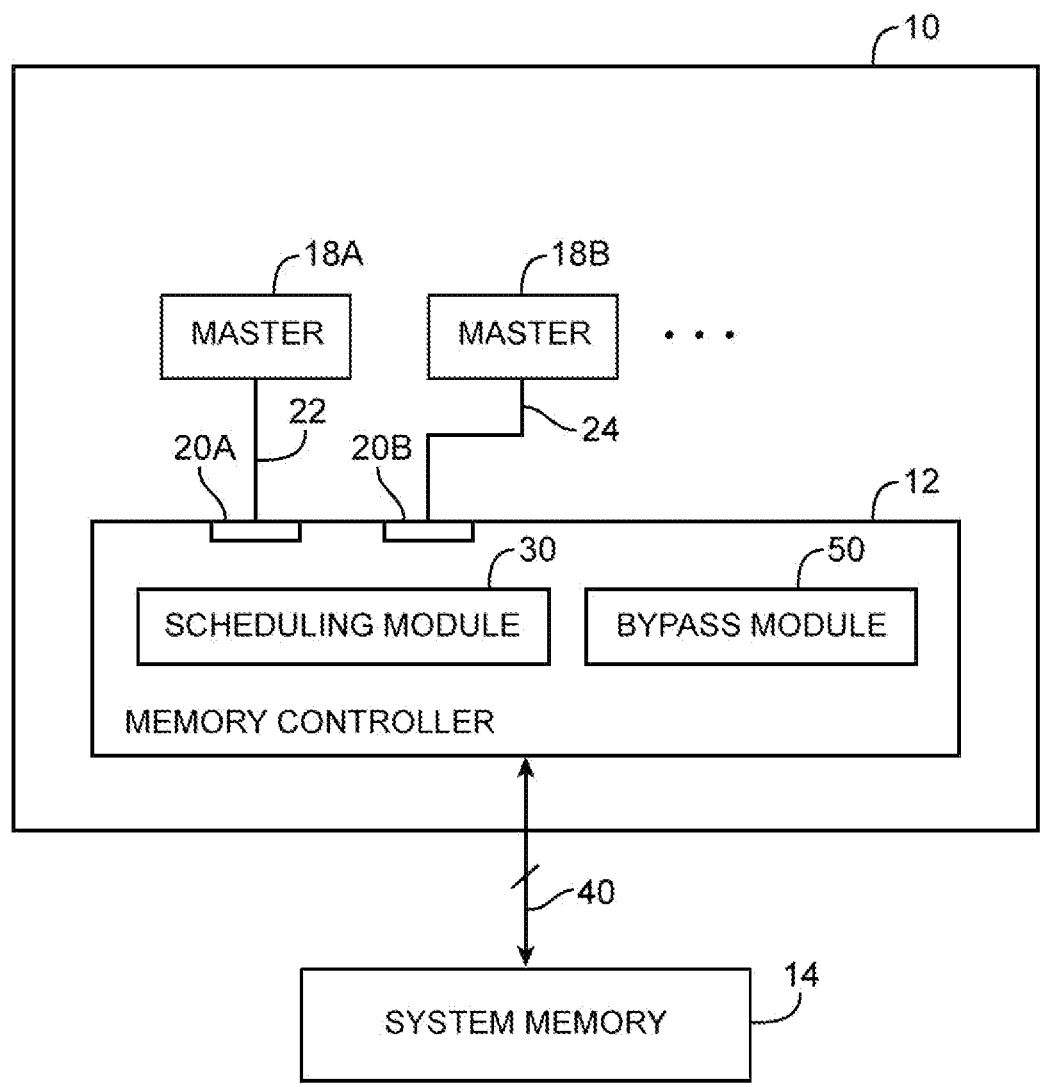
FIG. 1 is a diagram of an illustrative integrated circuit operable to communicate with system memory in accordance with an embodiment of the present invention.

Embodiments of the present invention relate to integrated circuits that contain memory controllers. Integrated circuits may include processing modules such as general purpose processing modules or processing modules that perform specific tasks. Processing modules may be used to perform tasks that require access to system memory (e.g., to store data for later retrieval).

Each processing module that communicates with the memory controller may sometimes be referred to as a "master" processing module (or master). The memory controller may have ports coupled to respective master processing modules.

A master processing module may send an access request to the memory controller when the master processing module needs to access system memory. For example, a master processing module may send a read access request to the memory controller to retrieve data from memory. The memory controller may receive the read access request and fulfill the read access request by providing control signals to system memory (e.g., the memory controller may receive the read access request and provide control signals to system memory that configure system memory to respond with the requested data). As another example, the master processing module may send a write access request to the memory controller along with corresponding write data to be loaded into system memory. The memory controller may receive the write access request and fulfill the write access request by configuring system memory to overwrite system memory at the specified address.

Due to limitations of system memory, the memory controller can only fulfill a limited number of access requests within a given time period. For example, system memory may be formed from several memory banks (e.g., 4 or 8 memory banks). At any given time, each memory bank may be configured to fulfill only one memory access request (i.e., a second memory access request following a first memory access request to a memory bank may be delayed until the memory controller has finished fulfilling the first memory access request).

Each of the master processing modules may send a number of memory access requests to a corresponding port in the memory controller. Due to the limitations of system memory, the memory access requests from the master processing modules are processed in a sequential order. In order to process large numbers of memory access requests, the memory controller may be provided with a scheduling circuit (sometimes referred to as a scheduler or scheduling module) that receives memory access requests in parallel from the master processing modules and arranges the memory access requests in a desired order for serial processing (i.e., a desired order in which to fulfill the memory access requests from the masters).

Scheduling modules may process memory access requests received from master processing modules. For example, a scheduling module may process the memory access requests by arranging the received memory access requests in a desired order for fulfillment with system memory. Conventional scheduling modules introduce delay when processing memory access requests (e.g., a scheduling module may introduce delay when arranging the received memory access requests in a desired order).

The amount of time delay introduced by a scheduling module (sometimes referred to as scheduling latency) may range from one system clock cycle to tens of clock cycles (as examples). For example, a scheduling module may introduce delay when it is used to support multiple priority schemes (e.g., bandwidth based allocation or priority value based allocation), adjustable port counts (i.e., the number of master processing modules that provide memory access requests may be adjustable), and adjustable port priority assignment.

As an example, a memory controller may simultaneously receive 10 memory access requests from 10 different master processing modules (i.e., the memory controller may receive 10 memory access requests from 10 unique master processing modules in one system clock cycle). In this scenario, a scheduling module may be used to schedule the memory access requests by arranging them into a desired order for fulfillment (e.g., a first memory access request followed by a second memory access request, third memory access request, etc.). The fulfillment of at least some of the scheduled memory access requests may be delayed by the order in which the memory access requests are arranged (e.g., the fulfillment of the first memory access request may delay the fulfillment of all subsequent memory access requests relative to the time at which the memory access requests were received by the memory controller).

The scheduling delay introduced by a scheduling module may occur even when only one memory access request is received by a corresponding memory controller. For example, a memory controller and an associated scheduling module that are initially idle may receive a single memory access request from a given master processing module. In this case, the scheduling module may process the received memory access request with a predetermined latency associated with the operation of the scheduling module. The predetermined latency may be one cycle, two cycles, or a number of cycles associated with the complexity of the scheduling module.

It may be desirable to reduce the scheduling latency (e.g., system performance may be improved by decreasing the scheduling latency). A bypass module may be used to reduce scheduling latency by allowing selected memory access requests to be more quickly fulfilled (i.e., the memory controller may fulfill the selected memory access requests without processing the memory access requests with the scheduling module). FIG. 1 shows an illustrative integrated circuit 10 that includes a memory controller having a bypass module.

As shown in FIG. 1, device 10 may include master processing modules 18A and 18B (sometimes referred to herein as masters 18). Master processing modules may include processing circuits such as general purpose processing circuits, video processing circuits, audio processing circuits, networking circuits, and other processing modules that require access to system memory.

Master processing modules 18A and 18B may be formed from hardened logic (e.g., as found in an application-specific integrated circuit). Alternatively, master processing modules 18A and 18B may be formed from programmable logic (e.g., logic that includes memory elements that provide static control output signals that control the states of associated logic components. As an example, master processing modules 18A and 18B may be formed from programmable logic that can be reconfigured by re-routing data paths associated with the modules). Memory controller 12 may serve as an interface between integrated circuit 10 and system memory 14. System memory 14 may, for example, be formed from double data rate synchronous dynamic random access memory (e.g., DDR1, DDR2, and DDR3 SDRAM) or other suitable types of memory. Memory controller 12 may be coupled to system memory 14 via path 40.

Device 10 may use memory controller 12 to communicate with system memory 14 by providing memory controller 12 with read access requests and write access requests. Memory controller 12 may fulfill the memory access requests by directing system memory 14 to respond to the memory access requests. For example, device 10 may provide memory controller 12 with a read access request to read a word of data from a desired address within system memory 14. In response to receiving the read request, memory controller 12 may process the request, generate corresponding control signals, and convey the control signals to system memory 14 via path 40. The control signals (e.g., system clock, memory address, and command signals) generated by memory controller 12 may direct system memory 14 to reply with data stored at the desired address. As another example, device 10 may provide memory controller 12 with a write access request to write a word of data to a desired address in system memory 14. In response to receiving the write request, memory controller 12 may generate and transmit control signals (e.g., signals that direct system memory 14 to store the word of data at the desired address) to system memory 14 via path 40.

Master processing modules 18 may be configured to perform various tasks. For example, a first module 18A may be configured to perform general purpose tasks (e.g., module 18A may be configured as a general purpose processing module) and a second module 18B may be configured to perform other tasks (e.g., module 18B may be configured to perform video decoding tasks). Modules 18 (e.g., modules 18A and 18B) may require access to system memory 14 when performing certain tasks. For example, to complete video decoding tasks, module 18B may read and store data from specified addresses in system memory 14.

Modules 18 may be coupled to respective ports 20 in memory controller 12. For example, module 18A may be coupled to port 20A, whereas module 18B may be coupled to port 20B. The example of FIG. 1 having two processing modules is merely illustrative and is not intended to limit the scope of the present invention. If desired, zero master modules, three or more master modules, ten or more master modules, or other processing circuitry that requires access to system memory 14 may be formed. Additionally, masters 18 may be formed from programmable logic (e.g., formed from programmable circuitry in a programmable logic device), but in other embodiments, the masters may be formed from hardened logic, (e.g., as can be found in an application-specific integrated circuit).

Many master processing modules (e.g., ten or more master processing modules) may be coupled to memory controller 12. The master processing modules may each require access to system memory at any given time. For example, several or all of the master processing modules may provide memory controller 12 with memory access requests within a single system clock cycle. Memory controller 12 can fulfill only a limited number of the memory access requests that it receives. For example, due to limitations specified by a memory interface protocol currently under use, memory controller 12 may only be able to configure system memory 14 to fulfill one memory access request at a time (e.g., memory access requests from masters 18A and 18B cannot be fulfilled simultaneously even if masters 18B and 18B send the request to memory controller 12 in parallel).

It may be desirable to prioritize the memory access requests associated with one master processing module relative to the memory access requests associated with another master processing module. For example, tasks performed by master processing module 18B may be more time sensitive than tasks performed by master processing module 18A. In this scenario, the memory access requests associated with master 18B may be fulfilled before the memory access requests associated with master 18A even if the memory access requests from master 18A were provided to memory controller 12 before the memory access requests from master 18B.

To accommodate memory access requests associated with multiple master processing modules each assigned with a respective priority level and to accommodate memory access requests that exceed the fulfillment capabilities of system memory, memory controller 12 may include a scheduling module 30.

Scheduling module 30 may receive memory access requests from each master module. Each memory access request may include information regarding the type of memory access request (e.g., a read access request, write access request, etc.), data associated with the memory access request (e.g., write data to be stored in system memory 14), address data (e.g., a system memory address corresponding to a location in system memory 14 at which to read or write data), or other desirable information associated with the memory access request.

Scheduling delays (e.g., scheduling latencies) may be introduced by scheduling module 30. Scheduling module 30 may introduce a scheduling latency when processing memory access requests based on priority values to arrange them into an order for fulfillment (as an example). To reduce scheduling latencies associated with fulfilling memory access requests with system memory, memory controller 10 may include bypass module 50.

Bypass module 50 may identify scenarios in which scheduling a memory access request received from masters 18 is not necessary. For example, memory controller 12 may initially be idle (i.e., memory controller 12 may not be fulfilling any memory access requests) when it receives a single memory access request. In this scenario, it may be unnecessary to process the received memory access request with scheduling module 30, because there is only one memory access request to forward to system memory 14. To avoid unnecessary processing overhead and to reduce processing latency introduced by scheduling module 30, bypass module 50 may identify the memory access request to be immediately fulfilled by memory controller 12 (e.g., bypass module 50 may allow eligible memory access requests to bypass scheduling module 30). This scenario is merely illustrative. Bypass module 50 may identify memory access requests from other scenarios suitable for scheduler bypassing. Bypass module 50 may identify bypass eligible memory access requests based on the type of data being accessed by the memory access requests or the functions being performed by the master processing modules (as examples).

Bypass module 50 may be formed from programmable logic (e.g., formed from memory elements that provide static control output signals that control the states of associated logic components) or formed from non-reconfigurable circuitry (e.g., as found in application-specific integrated circuits).

Figure 2:
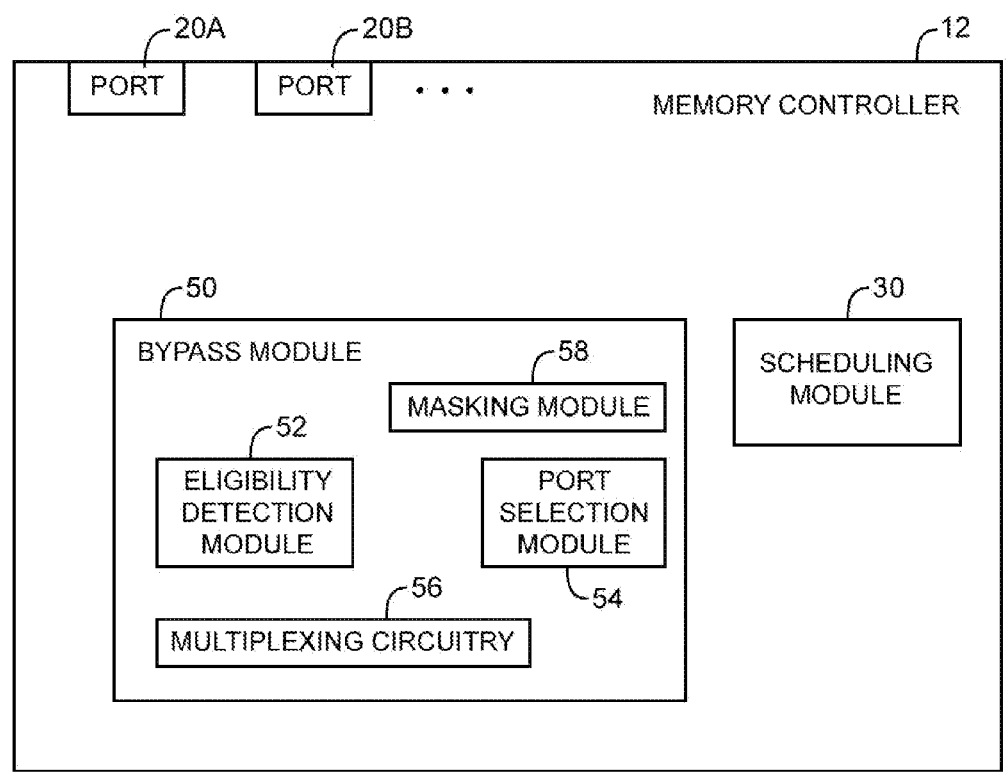
FIG. 2 is a diagram of an illustrative memory controller with a bypass module in accordance with an embodiment of the present invention.

The diagram of FIG. 2 shows an illustrative memory controller 12 with bypass module 50 and scheduling module 30 configured to sort memory access requests received at ports 20 (e.g., ports 20A and 20B). Bypass module 50 may include eligibility detection module 52, port selection module 54, multiplexing circuitry 56, and masking module 58.

Eligibility detection module 52 may identify whether or not each memory access request received at ports 20 is eligible for bypassing scheduling module 30. A memory access request may, for example, be considered eligible for bypassing scheduler 30 if there are no other recently received memory access requests or if there are no other currently received memory access requests.

Port selection module 54 may identify the port at which a bypass eligible memory access request was received and route the memory access request to multiplexing circuitry 56. For example, eligibility detection module 52 may identify a memory access request received at port 20A that is eligible for bypassing scheduling module 30. In this scenario, port selection module 54 may identify port 20A as bypass eligible and route the bypass eligible memory access request from identified port 20A to multiplexing circuitry 56.

Multiplexing circuitry 56 may be configured to selectively route to its output bypass eligible memory access requests provided by port selection module 54 or scheduled memory access requests provided by scheduling module 30. The output of multiplexing circuitry 56 may be coupled to system memory 14. The memory access requests provided at the output of multiplexing circuitry 56 may be fulfilled by memory controller 12 (e.g., the memory access requests selected by circuitry 56 may be fulfilled by controller 12 using system memory).

It may be desirable to prevent scheduling module 30 from scheduling memory access requests that have been bypassed by bypass module 50 (e.g., to prevent memory controller 12 from fulfilling the same memory access request more than once). Masking module 58 may be used to prevent scheduling module 30 from scheduling memory access requests that have been bypassed (e.g., by preventing scheduling module 30 from receiving the bypassed memory access requests or by preventing scheduling module 30 from providing the bypassed memory access requests for fulfillment by memory controller 12).

It should be understood that bypass module 50 may be formed separately from scheduling module 30 as shown in FIG. 2 or formed as an integral part of scheduling module 30 in a single module.

Figure 3A:
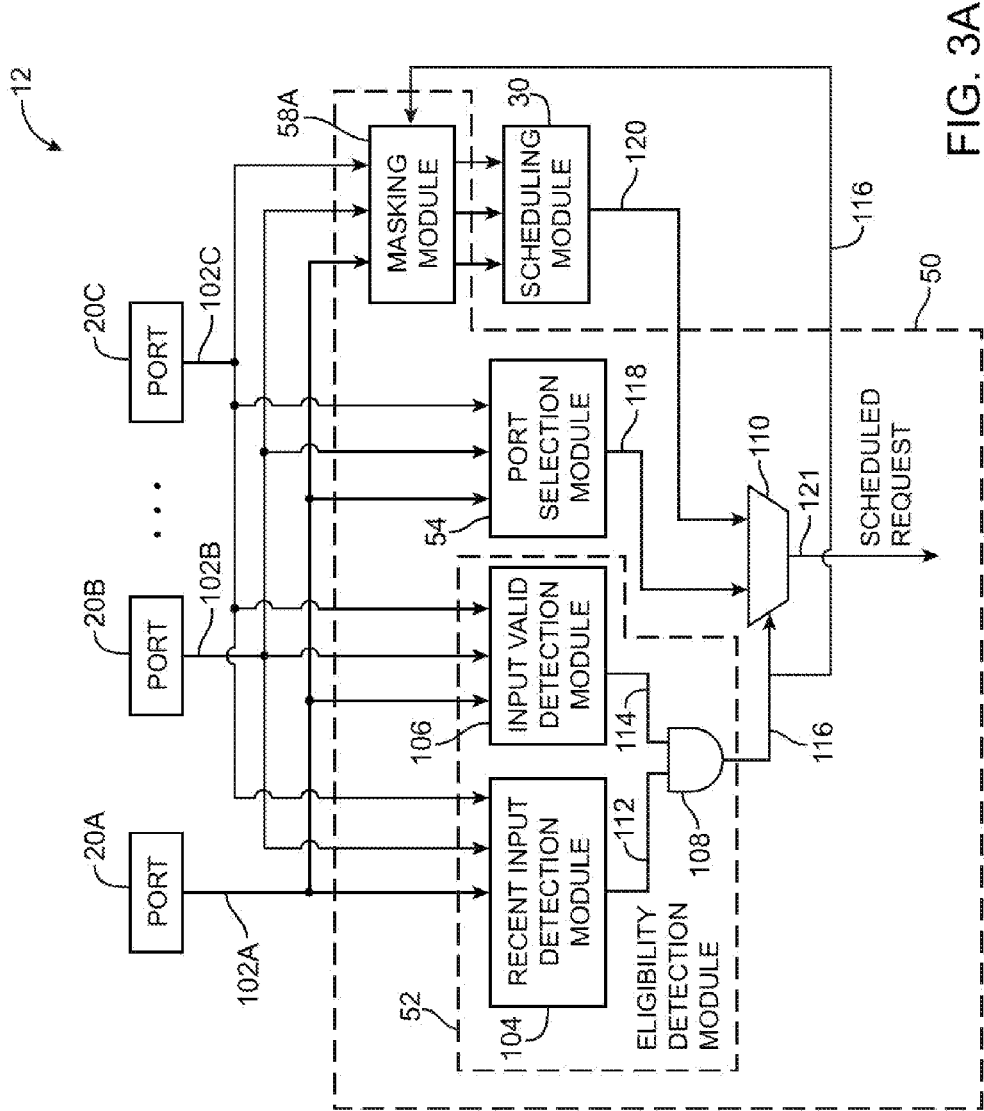
FIG. 3A is a diagram of an illustrative memory controller with a bypass module configured to mask memory access requests at the input of a scheduling module in accordance with an embodiment of the present invention.

An arrangement in which scheduling module 30 can be prevented from receiving bypassed memory access requests is shown in FIG. 3A. As shown in FIG. 3A, memory controller 12 may contain ports 20 (e.g., ports 20A, 20B, and 20C) that receive memory access requests from respective master processing modules (not shown in FIG. 3A for clarity). Each port may be coupled to eligibility detection module 52, port selection module 54, and scheduling module 30 via respective paths. Eligibility module 52 may include recent input detection module 104, input valid detection module 106, and logic AND gate 108. Recent input detection module 104 and input valid detection module 106 may be coupled to the inputs of AND gate 108 via respective paths 112 and 114. Recent input detection module 104 and input valid detection module 106 may be coupled to port 20A via path 102A, to port 20B via path 102B, and to port C via path 102C. Scheduling module 30 may be coupled to ports 20A, 20B, and 20C via masking module 58A and corresponding paths 102A, 102B, and 102C.

Eligibility detection module 52 may be coupled to multiplexer 110 and masking module 58A via control path 116. Port selection module 54 may be coupled to multiplexer 110 via path 118. Scheduling module 30 may be coupled to multiplexer 110 via path 120.

During normal operation of memory controller 12, ports 20 (e.g., ports 20A, 20B, and 20C) may receive memory access requests and forward the memory access requests to recent input detection module 104, input valid detection module 106, port selection module 54, and scheduling module 30 via respective paths (e.g., port 20A may receive memory access requests from a corresponding master processing module and forward the memory access requests to port selection module 54 via path 102A).

Recent input detection module 104 may be configured to identify previously received combinations of memory access requests that are suitable for scheduler bypassing. For example, recent input detection module 104 may identify whether or not memory access requests have been received recently. In one embodiment, this determination may be based on whether or not memory access requests have been received in recent clock cycles prior to the current clock cycle. In another embodiment, recent input detection module 104 may be configured to identify whether or not memory access requests have been received from any of ports 20 (e.g., ports 20A, 20B, or 20C) in the system clock cycle immediately prior to the current system clock cycle. These examples are merely illustrative. Recent input detection module 104 may be configured to identify any desirable pattern of memory access requests received prior to the current system clock cycle.

Input valid detection module 106 may be configured to identify whether the current combination of received memory access requests is suitable for scheduler bypassing. In one embodiment, input valid detection module 106 may be configured to identify whether or not only one memory access request is currently received at ports 20. In another embodiment, input valid detection module 106 may be configured to identify whether or not memory access requests are currently being received through only some of ports 20. These examples are merely illustrative. Input valid detection module 106 may be configured to identify any combination of currently received memory access requests suitable for scheduler bypassing.

Logic AND gate 108 may be used to generate an output for eligibility detection module 52. For example, logic AND gate 108 may have a first input configured to receive an output signal from recent input detection module 104, a second input configured to receive an output signal from input valid detection module 106, and an output 116 on which an eligibility control signal is provided. The value of the control signal may indicate whether a current memory access request is eligible for scheduler bypassing.

In one embodiment, port selection module 54 may be configured to identify which one of ports 20 is currently providing a memory access request that is eligible for scheduler bypassing and may further be configured to route the memory access request from the identified port to multiplexer 110. For example, memory controller 12 may receive a memory access request at port 20B. In this scenario, eligibility detection module 52 may identify that the memory access request is eligible for scheduler bypassing and port selection module 54 may identify the source of the memory access request as port 20B and route the identified memory access request from port 20B to multiplexer 110.

In another embodiment, port selection module 54 may be configured to receive a control signal from eligibility detection module 52 that identifies a port associated with a bypass eligible memory access request (e.g., eligibility detection module 52 may provide a control signal to port selection module 54 that directs port selection module 54 to select a port associated with a bypass eligible memory access request).

Eligibility detection module 52 may direct multiplexer 110 to route memory access requests from either port selection module 54 or scheduling module 30 (i.e., eligibility detection module 52 may couple one of paths 118 and 120 to multiplexer output 121 in response to receiving the eligibility control signal from eligibility detection module 52 via path 116). In this way, multiplexer 110 may provide a low latency path through which selected memory access requests may bypass scheduling module 30 (i.e., a low latency path through port selection module 54). Multiplexer 110 may provide a switching path for scheduled memory access requests. It should be understood that other circuits may be used to provide a switching path for port selection module 54 and scheduling module 30 (e.g., tri-state based switching circuits or other desirable switching circuits may be used).

It may be desirable to prevent scheduling module 30 from receiving memory access requests that have been identified as eligible for scheduler bypassing. Masking module 58A may receive the eligibility control signal from eligibility detection module 52 via path 116 and prevent bypass eligible memory access requests from reaching the input of scheduling module 30 (e.g., by providing appropriate signals to scheduling module 30 that prevent the bypass eligible memory access requests from reaching scheduling module 30).

FIG. 3B shows an illustrative arrangement of masking module 58A configured to prevent bypass eligible memory access requests from reaching scheduling module 30. As shown in FIG. 3B, masking module 58A includes mask circuits 122 that receive memory access requests from respective ports 20. In the example of FIG. 3B, ports 20A, 20B, and 20C are respectively coupled to first, second, and third masks 122. Each mask circuit 122 may have an input that receives the eligibility control signal from eligibility detection module 52 via path 116. When the eligibility control signal identifies that a memory access request provided by ports 20 is eligible for scheduler bypassing, each mask 122 provides substitute control signals to scheduling module 30 in place of the memory access request signals provided by ports 20. The substitute control signals may indicate to scheduling module 30 that no memory access requests were received at ports 20.

For example, port 20C may receive a bypass eligible memory access request. In this example, eligibility detection module 52 may detect the bypass eligible memory access request and provide an eligibility control signal to masks 122 that directs masks 122 to prevent the bypass eligible memory access request from reaching scheduling module 30 (e.g., by providing substitute control signals or masked control signals to scheduling module 30).

Figure 4A:
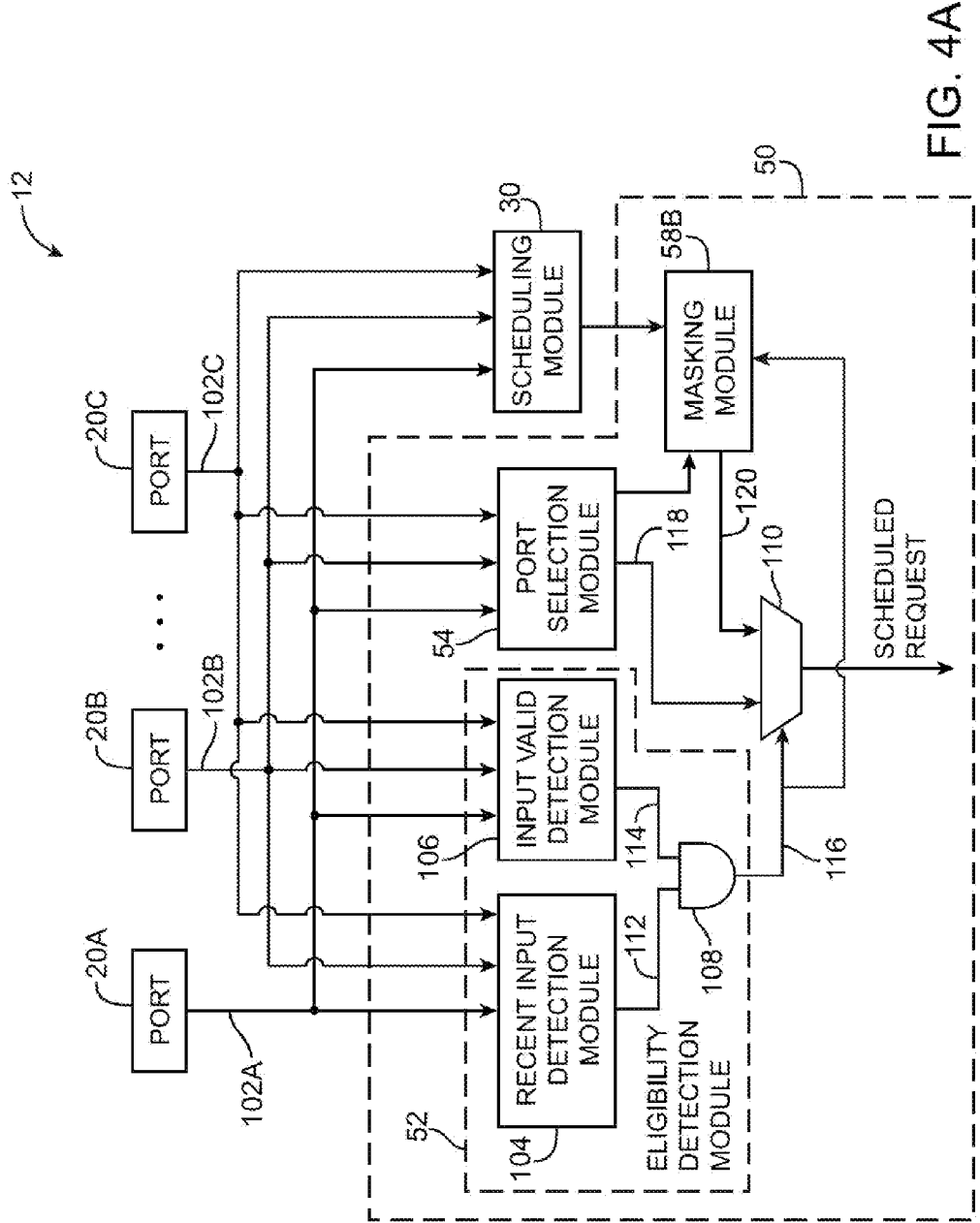
FIGS. 4A and 4B are diagrams of an illustrative memory controller with a bypass module that masks memory access requests at the output of a scheduling module in accordance with an embodiment of the present invention.

It may be desirable to prevent bypass eligible memory access requests from being scheduled by preventing scheduling module 30 from feeding the bypass eligible memory access request to multiplexer 110. The diagram of FIG. 4A shows an illustrative arrangement in which masking module 58B is interposed between scheduling module 30 and multiplexer 110. Masking module 58B may prevent scheduling module 30 from providing memory access requests to multiplexer 110 that have already been fulfilled via bypass mechanisms and allow scheduling module 30 to provide memory access requests to multiplexer 110 that have not been fulfilled via bypass mechanisms.

To prevent scheduling module 30 from providing memory accesses that have already been fulfilled, masking module 58B of FIG. 4A may identify the amount of time required for scheduling module 30 to process each bypass eligible memory access request. For example, masking module 58B may identify that a given bypass eligible memory access request requires one system clock cycle to process with scheduling module 30 (i.e., scheduling module 30 may require one system clock cycle to schedule the given bypass eligible memory access request and provide the scheduled memory access request at the output of scheduling module 30). In this scenario, masking module 58B may wait until the scheduled memory access request is provided at the output of scheduling module 30 and prevent the scheduled memory access request from reaching multiplexer 110 (i.e., masking module 58B may wait one system clock cycle after the bypass eligible memory access request is received by scheduling module 30).

To allow scheduling module 30 to schedule normal memory access requests (e.g., requests that have not been fulfilled via bypass mechanisms), masking module 58B may identify the normal memory access requests and route the normal memory access requests to multiplexer 110 for fulfillment.

Figure 4B:
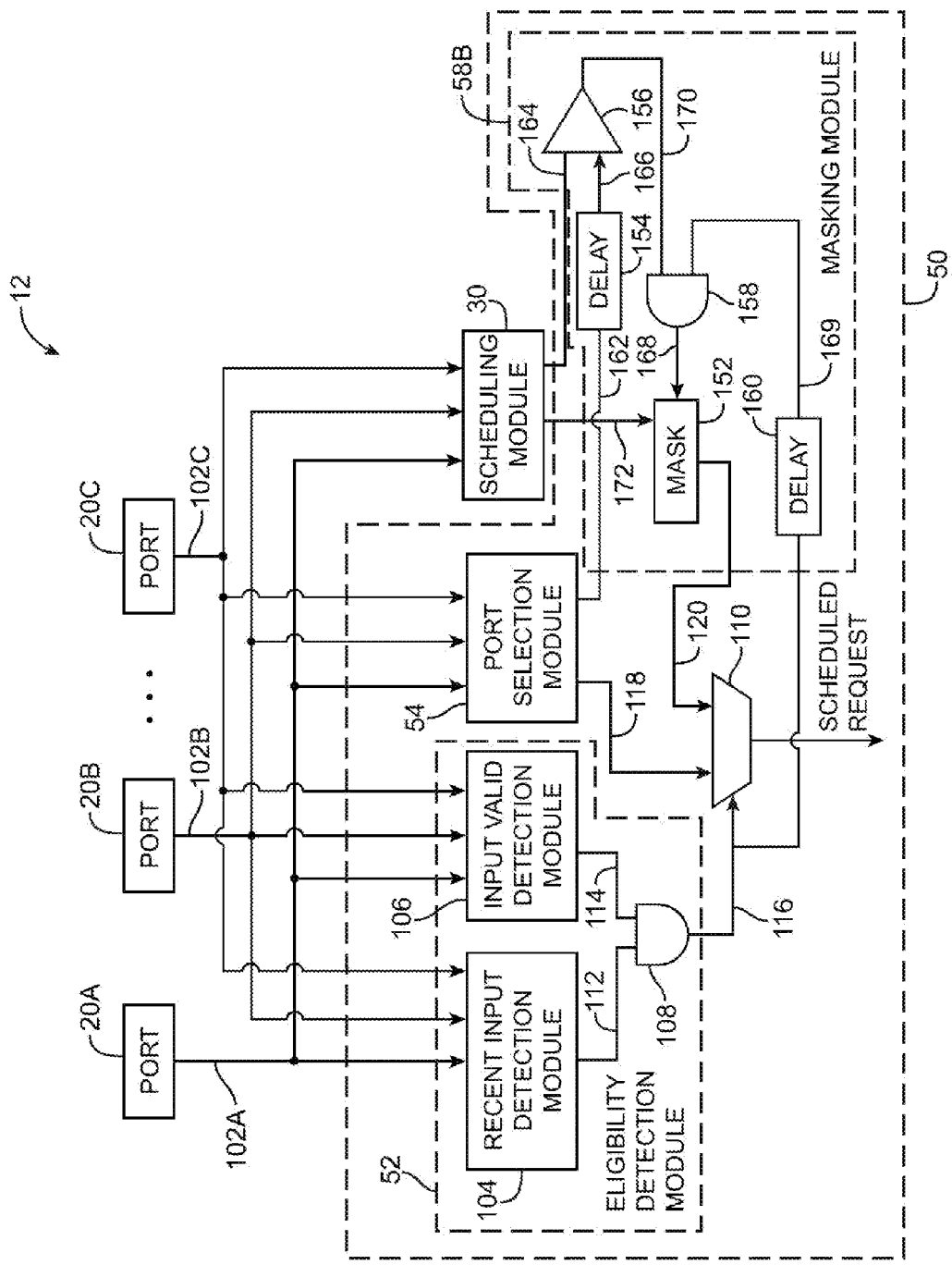

FIG. 4B shows one possible implementation of the masking module of the type described in connection with FIG. 4A that may be used to prevent bypass eligible memory access requests from being scheduled by scheduling module 30. In the arrangement of FIG. 4B, masking module 58B may include mask circuit 152, delay circuits 154 and 160 (e.g., inverter chains, flip-flops, registers, or other suitable delay elements), comparator 156, and logic AND gate 158.

The input of delay circuit 154 may be coupled to port selection module via path 162. The inputs of comparator 156 may be coupled to scheduling module 30 via path 164 and the output of delay circuit 154 via path 166.

Delay circuit 160 may be coupled to the output of eligibility detection module 52 via path 116. The inputs of AND gate 158 may be coupled to the output of delay circuit 160 via path 168 and the output of comparator 156 via path 170. The inputs of mask 152 may be coupled to the output of AND gate 158 via path 168 and scheduling module 30 via path 172.

Delay circuit 160 may receive and store the output of eligibility detection module 52. The information stored in delay circuit 160 may identify whether or not a memory access request has been recently allowed to bypass scheduling module 30 (e.g., delay circuit 160 may store a "1" if a memory access request has been recently allowed to bypass scheduling module 30 and may store a "0" if no memory access request has been recently allowed to bypass scheduling module 30).

Comparator 156 may identify whether a memory access request previously fulfilled via bypass mechanisms is currently being provided by scheduling module 30. For example, information relating to a memory access request previously fulfilled using port selection module 54 may be stored by delay circuit 154 and provided to comparator 156. In this scenario, comparator 156 may identify that scheduling module 30 is currently attempting to fulfill the memory access request that has already been fulfilled by bypass mechanisms (e.g., comparator 156 may compare memory access requests provided by scheduling module 30 to the information stored in delay circuit 154).

For example, scheduling module 30 may introduce a one cycle latency for memory access requests that are eligible for scheduler bypassing (e.g., scheduling module 30 may introduce a processing delay of one clock cycle when a memory access request is received with no other memory access request currently or recently received). In this case, delay circuit 154 and 160 may be configured to delay information corresponding to bypass eligible memory access requests by one system clock cycle.

Logic AND gate 158 may provide a control signal to mask circuit 152 identifying that a memory access request was recently allowed to bypass scheduling module 30 and the memory access request is also being provided by scheduling module 30 (e.g., by performing a logic AND operation on the output of delay circuit 160 and the output of comparator 156).

Mask circuit 152 may receive the control signal from AND gate 158 and block scheduling module 30 from providing memory access requests that have already been processed (e.g., via a bypass mechanism using port selection module 54). For example, a memory access request may have been recently been allowed to bypass scheduling module 30 via port selection module 54 and multiplexer 110. In this case, delay element 160 may identify that a memory access request was recently bypassed and delay element 154 may identify information relating to the bypassed memory access request (e.g., delay element 154 may store the source port of the bypassed memory access request). Logic AND gate 158 and comparator 156 may provide an output to mask circuit 152 identifying that scheduling module 30 is attempting to provide the bypassed memory access request on path 172 for fulfillment. Mask circuit 152 may receive the control output provided by AND gate 158 and prevent the memory access request provided by scheduling module 30 from reaching multiplexer 110.

Figure 5A:
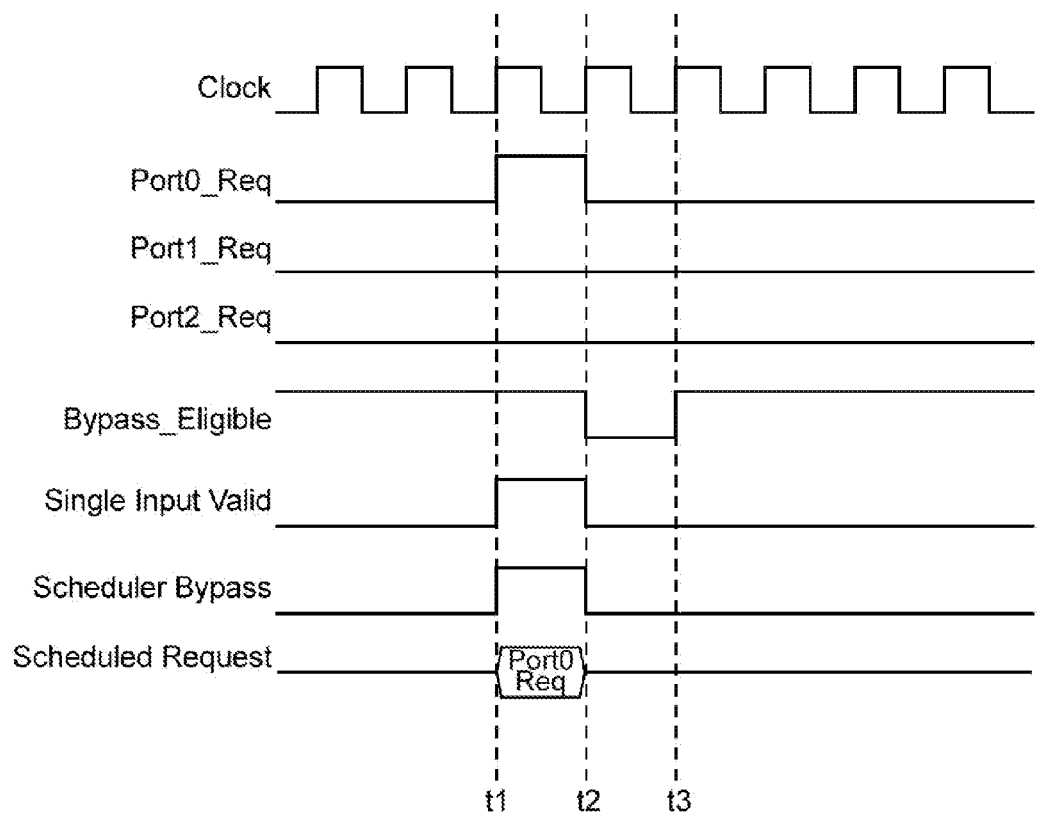
FIG. 5A is a timing diagram illustrating a scenario in which a memory access request is allowed to bypass a scheduling module in accordance with an embodiment of the present invention.
Figure 5B:
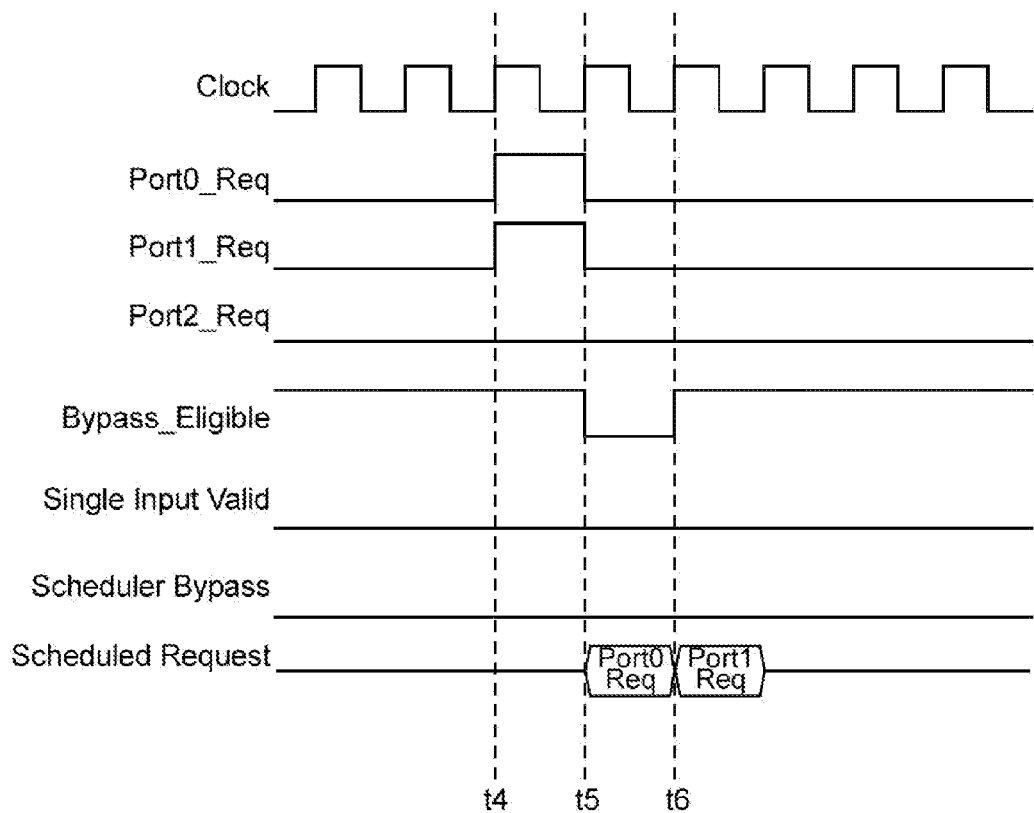
FIG. 5B is a timing diagram illustrating a scenario in which two parallel memory access requests may be processed with a scheduling module in accordance with an embodiment of the present invention.
Figure 5C:
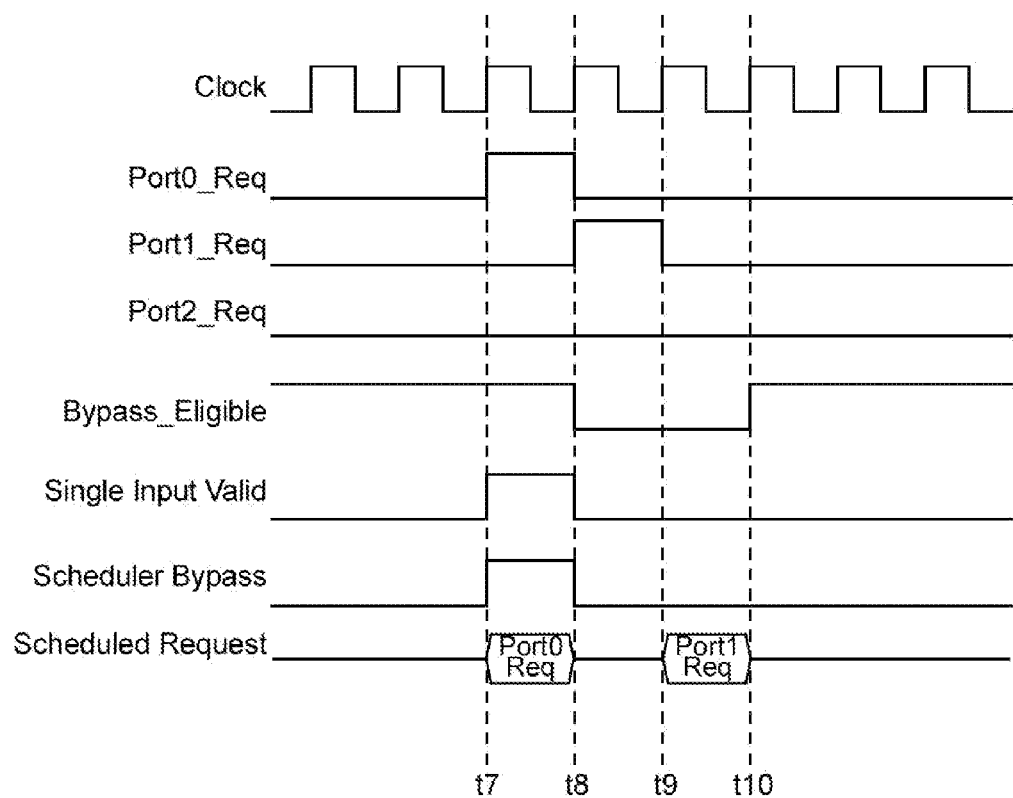
FIG. 5C is a timing diagram illustrating a scenario in which a first memory access request is allowed to bypass a scheduling module while a second memory access request is processed using the scheduling module in accordance with an embodiment of the present invention.

FIGS. 5A, 5B, and 5C show illustrative scenarios in which memory access requests provided by masters may be bypassed (e.g., using the circuit configurations as shown in FIG. 3A, 3B, 4A, or 4B). In the scenario of FIG. 5A, memory access requests may be received at various ports (e.g., port0_Req may be received at a first port 20A, port1_Req may be received at a second port 20B, and port2_Req may be received at a third port 20C).

The bypass eligible signal (e.g., the output signal of recent input detection module 104) may identify whether current memory access requests are eligible for scheduler bypassing. The single input valid signal (e.g., the output signal of input valid detection module 106) may identify whether a combination of current memory access requests received at the various ports is valid for scheduler bypassing. The scheduler bypass signal (e.g., the output of AND gate 108) may identify whether scheduler bypassing should be performed (e.g., when the outputs of recent input detection module 104 and input valid detection module 106 are both asserted).

In the example of FIG. 5A, none of the ports may initially be requesting memory accesses. At time t1, the first port may receive a memory access by providing a logic high signal at port0_req. In response to the signal provided at port0_req, the single input valid signal may be asserted to identify that only one port is currently requesting access to system memory (e.g., only one of ports 20A, 20B, and 20C is providing a logic high port request signal) by asserting a single input valid signal. The bypass_eligible signal may be asserted to identify that no memory access requests were recently received at ports 20A, 20B, or 20C (e.g., that no memory access requests were received in the previous system clock cycle). In response to the assertion of the single input valid signal and the bypass_eligible signal, the scheduler bypass signal may be asserted and the memory access request received at port 20A (and identified by the port0_req signal) may be allowed to bypass scheduling module 30 via port selection module 54.

At time t2, the first port may no longer be receiving memory access requests (i.e., port0_req may no longer be asserted). At this time, the single input valid signal may be de-asserted because no memory access request are currently being received and the bypass_eligible signal may be de-asserted to reflect the recent memory access request (at time t1).

At time t3, the bypass_eligible signal may be asserted to reflect that no recent memory access requests are queued for processing (e.g., that no memory access requests were received in the previous system clock cycle).

In the example of FIG. 5B, none of the ports may initially be requesting memory accesses. At time t4, the first port and the second port may receive memory access requests (e.g., memory access requests may be provided to the first and second ports by corresponding master processing modules). At this time, the bypass_eligible signal may be asserted to reflect that no memory access requests were recently provided and the single input valid signal may remain de-asserted to reflect that more than one port is receiving memory access requests (i.e., both port0_req and port1_req are asserted). In this scenario, the memory access requests received at the first and second ports may not be allowed to bypass scheduling module 30 (i.e., scheduler bypass may remain de-asserted and no request may be scheduled for bypassing).

The memory access requests received at the first and second ports may be normally scheduled for fulfillment by scheduling module 30. For example, the first port may be assigned a higher priority than the second port. In this case, scheduling module 30 may process the memory access request received at the first port with a one cycle latency and may process the memory access request received at the second port with a two cycle latency (i.e., the memory access request received at the first port may be provided as a scheduled request at time t5 and the memory access request received at the second port may be provided as a scheduled request at time t6).

At time t5, the first and second ports may no longer be receiving memory access requests (i.e., the port0_req and the port1_req are no longer be asserted). At this time, the single input valid signal may be de-asserted because no memory access request are currently being received and the bypass_eligible signal may be de-asserted to reflect the recent memory access request (at time t4). At time t6, the bypass_eligible signal may be asserted to reflect that no recent memory access requests have been received (e.g., that no memory access requests were received in the previous system clock cycle).

In the example of FIG. 5C, a first port may receive a first memory access request at time t7 and a second port may receive a second memory access request at time t8. At time t7, the bypass_eligible signal may be asserted and the single input valid signal may be asserted (e.g., because no memory access requests have recently been received and only one memory access request is currently being received). The first memory access request may be allowed to bypass scheduling module 30 via a low latency path through port selection module 54 and multiplexer 110.

At time t8, the bypass_eligible signal may be de-asserted to identify that the request corresponding to port0_req was received in the previous system clock cycle. The second memory access request may be normally scheduled via scheduling module 30 (e.g., because a memory access request was recently allowed to bypass scheduling module 30).

At time t9, ports 20A, 20B, and 20C may no longer be receiving memory access requests. Scheduling module 30 may also have completed processing of the memory access request received at the second port and provide the memory access request received at the second port as a scheduled request.

At time t10, the bypass_eligible signal may be asserted to reflect that no memory access requests were received at the system clock cycle corresponding to time t9.

Figure 6:
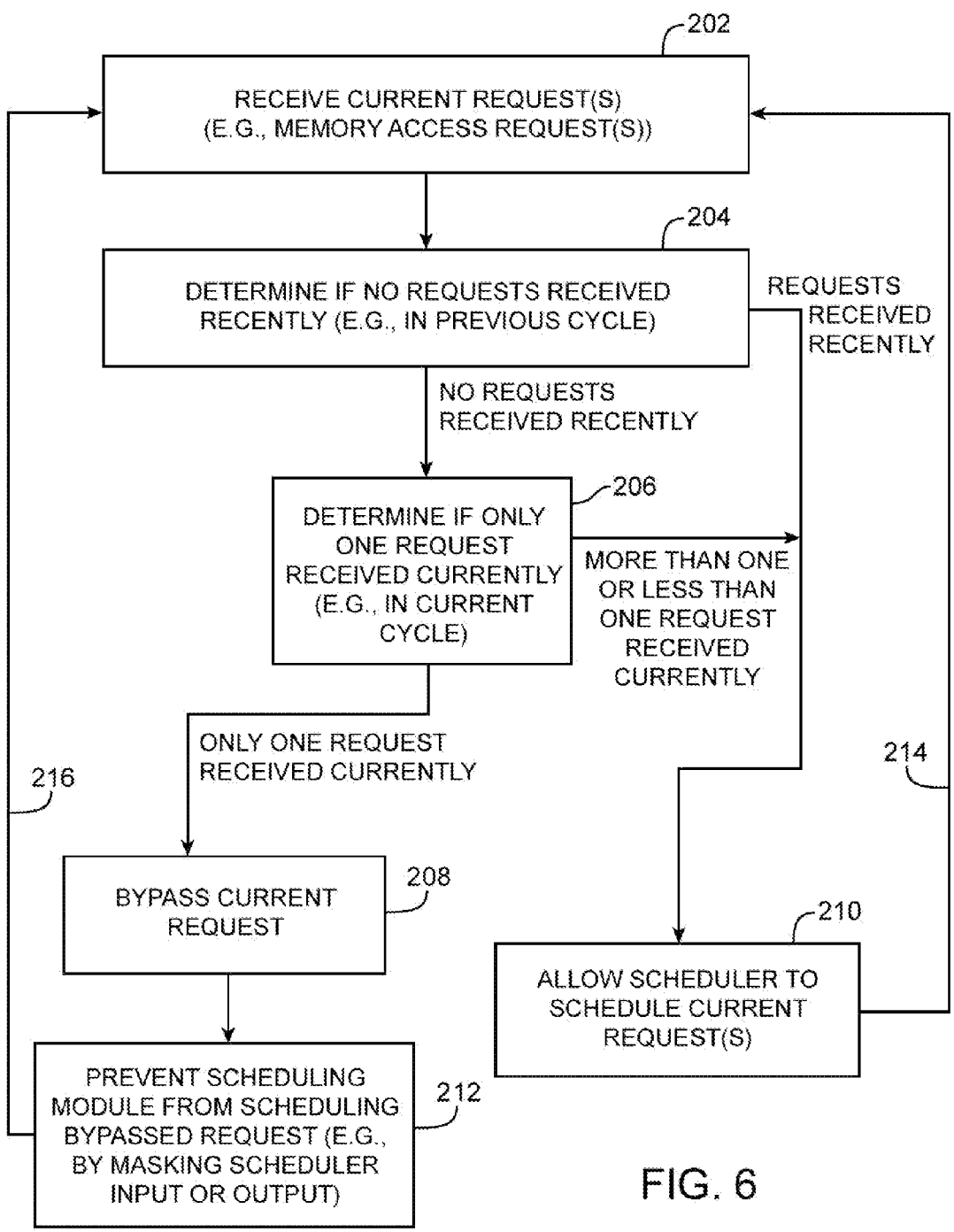
FIG. 6 is a flow chart of illustrative steps for selectively allowing memory access requests to bypass a scheduling module in accordance with an embodiment of the present invention.

The flowchart of FIG. 6 shows illustrative steps for identifying memory access requests that are eligible for scheduler bypassing and for processing the bypass-eligible memory access requests. In step 202, current memory access requests may be received (e.g., memory access requests may be received by a memory controller 12 at various ports).

In step 204, a bypass module may determine if no requests were recently received. For example, a bypass module 50 may include a recent input detection module 104 that identifies whether or not any memory access requests had been received at the ports of a memory controller 12 during recent system clock cycles. The recent system clock cycles may be equal to any desired number of clock cycles immediately prior to the current clock cycle. If the bypass module identifies that no requests were recently received, the operations of step 206 may be performed. If the bypass module identifies that requests were recently received, the operations of step 210 may be performed.

In step 206, the bypass module may determine whether or not only one request is currently received. For example, the bypass module 50 may include an input valid detection module 106 that asserts its output if only one memory access request is currently being received at the ports of memory controller 12 and de-asserts its output if more than one memory access request or no memory access requests are currently being received at the ports of controller 12. If the bypass module identifies that only one request is currently received, the operations of step 208 may be performed. If the bypass module identifies that more than one request or no requests are currently received, the operations of step 210 may be performed.

In step 208, a currently received memory access request may be allowed to bypass scheduling. For example, a bypass path may be enabled via a port selection module and a multiplexer that allows the received memory access request to bypass a scheduling module 30.

In step 210, currently received memory access requests may be scheduled for fulfillment. For example, a scheduling module 30 may be used to arrange the received memory access requests into an order for fulfillment with system memory. Processing may then loop back to step 202, as indicated by path 214.

In step 212, scheduling module 212 may be prevented from scheduling the memory access request allowed to bypass scheduling in step 208. For example, a masking module may be used at the input or output of scheduling module 212. Processing may then loop back to step 202, as indicated by path 216.

The operations of steps 202-212 may be performed by a programmable logic device, an application-specific integrated circuit (ASIC), in software on a general purpose processor, or any processing circuit suitable for performing scheduler bypassing.

What is claimed is:

1. An integrated circuit that includes master circuitry that generates memory access requests to access memory, comprising:
   a memory controller that receives the memory access requests from the master circuitry at first and second ports, wherein the memory controller accesses the memory to fulfill the memory access requests and fulfills the memory access requests in an order, the memory controller comprising:
      a scheduling module that controls the order in which the memory controller fulfills the memory access requests; and
      a bypass module that fulfills the memory access requests by bypassing the scheduling module based at least on recently received memory access requests, wherein the bypass module comprises a port selection module that provides a bypass path through which the memory access requests pass when bypassing the scheduling module, and wherein the port selection module and the scheduling module receive the memory access requests in parallel.

2. The integrated circuit defined in claim 1 wherein the bypass module comprises a recent input detection module that identifies the recent memory access requests, and wherein the bypass module bypasses the scheduling module based on the identified recent memory access requests.

3. The integrated circuit defined in claim 2 wherein the recent input detection module identifies memory access requests that have been received by the memory controller within a predetermined number of clock cycles before a current clock cycle.

4. The integrated circuit defined in claim 3 wherein the recent input detection module identifies memory access requests that have been received by the memory controller within a predetermined number of clock cycles before a current clock cycle, and wherein the predetermined number of clock cycles is equal to a number of clock cycles associated with controlling the order in which the memory controller fulfills the memory access requests.

5. The integrated circuit defined in claim 1 wherein the bypass module comprises an input valid detection module that identifies combinations of received memory access requests that are eligible for scheduler bypassing, and wherein the bypass module bypasses the scheduling module based on the identified combinations of received memory access requests.

6. The integrated circuit defined in claim 5 wherein the input valid detection module identifies the combinations of memory access requests in a current clock cycle.

7. The integrated circuit defined in claim 1 wherein the bypass module comprises an input valid detection module that identifies whether or not only one valid memory access request is received in a current clock cycle.

8. The integrated circuit defined in claim 1 wherein the bypass module comprises:
   a recent input detection module that identifies recent memory access requests; and
   an input valid detection module that identifies combinations of received memory access requests that are eligible for scheduler bypassing, wherein the bypass module bypasses the scheduling circuitry based on the identified recent memory access requests and the identified combinations of received memory access requests.

9. A memory controller that accesses memory to fulfill memory access requests, comprising:
   a plurality of ports that receive the memory access requests;
   a scheduling module that schedules the memory access requests for fulfillment in an order;
   a bypass module that fulfills the memory access requests by bypassing the scheduling module in response to identifying recent memory access requests; and
   a masking module that prevents the scheduling module from scheduling at least one of the memory access requests.

10. The memory controller defined in claim 9 wherein the masking module is coupled between the scheduling module and the ports and prevents the scheduling module from scheduling the memory access requests by preventing the memory access requests from reaching the scheduling module from the ports.

11. The memory controller defined in claim 10 wherein the bypass module further comprises an eligibility detection module that identifies which of the memory access requests are eligible for scheduler bypassing, and wherein the bypass module fulfills the identified memory access requests by bypassing the scheduling module.

12. The memory controller defined in claim 11 wherein the masking module prevents the scheduling module from receiving the memory access requests identified as being eligible for scheduler bypassing in response to at least one control signal from the eligibility detection module.

13. The memory controller defined in claim 12 wherein the eligibility detection module comprises:
   a recent input detection module that identifies recent memory access requests; and
   an input valid detection module that identifies combinations of received memory access requests that are eligible for scheduler bypassing, wherein the bypass module bypasses the scheduling module in response to the identified recent memory access requests and the identified combination of received memory access requests.

14. The memory controller defined in claim 9 wherein the masking module is coupled between the scheduling module and the memory and prevents the scheduling module from scheduling the memory access requests by preventing the memory access requests from reaching the memory from the scheduling module.

15. The memory controller defined in claim 14 wherein the masking module comprises storage elements that store information about previously fulfilled memory access request.

16. A method of accessing memory with a memory controller by fulfilling memory access requests, comprising:
   receiving the memory access requests at a plurality of ports in the memory controller;
   monitoring the received memory access requests with a bypass module;
   controlling the order in which the received memory access requests are fulfilled using a scheduling module;

identifying a combination of previously received memory access requests in the scheduling module and currently received memory access requests that is eligible for scheduler bypassing; and in response to identifying the combination of previously received and currently received memory access requests, fulfilling a first portion of the memory access requests by bypassing the scheduling module with the bypass module, and receiving a second portion of the memory access requests that is different from the first portion of the memory access requests at the scheduling module.

17. The method defined in claim 16 further comprising:

determining whether memory access requests have been received at the plurality of ports in a previous clock cycle; and in response to determining that none of the memory access requests have been received at the plurality of ports in the previous clock cycle, allowing a current memory access request received in a current clock cycle to bypass the scheduling module through the bypass module.

18. The method defined in claim 16 further comprising:

determining how many memory access requests are being received at the plurality of ports in a current clock cycle; and in response to determining that a single one of the memory access requests is being received at the plurality of ports in the current clock cycle, allowing that memory access request to bypass the scheduling module through the bypass module.

* * * * *